United States Patent [19]

Wong

[11] Patent Number: 5,177,633
[45] Date of Patent: Jan. 5, 1993

[54] OPTICAL PARAMETRIC OSCILLATOR WIDEBAND FREQUENCY COMB GENERATOR

[75] Inventor: Ngai C. Wong, Arlington, Mass.

[73] Assignee: Massachusetts Institute of Technology, Cambridge, Mass.

[21] Appl. No.: 721,232

[22] Filed: Jun. 26, 1991

Related U.S. Application Data

[63] Continuation-in-part of Ser. No. 420,572, Oct. 12, 1989, Pat. No. 5,070,260.

[51] Int. Cl.$^5$ ............................................. H03F 7/00
[52] U.S. Cl. .................................. 359/330; 372/32; 356/349
[58] Field of Search ................. 359/330, 326; 372/21, 372/23, 20, 32, 70; 356/349

[56] References Cited

U.S. PATENT DOCUMENTS

| | | | |
|---|---|---|---|
| H15 | 1/1986 | Chraplyvy | 372/3 |
| 3,328,723 | 6/1967 | Giordmaine et al. | 359/330 |
| 3,628,182 | 12/1971 | Ashkin | 359/330 |
| 3,662,183 | 5/1972 | Ashkin et al. | 359/330 |
| 3,914,618 | 10/1975 | Harris | 307/88.3 |
| 3,934,210 | 1/1976 | Yarborough et al. | 331/94.5 C |
| 4,019,159 | 4/1977 | Hon et al. | 332/7.51 |
| 4,085,335 | 4/1978 | Guilino | 307/88.3 |
| 4,124,466 | 11/1978 | Morrey | 204/157.1 R |
| 4,180,751 | 12/1979 | Ammann | 359/330 |
| 4,189,652 | 2/1980 | Levinos et al. | 359/330 |
| 4,349,907 | 9/1982 | Campillo et al. | 372/92 |
| 4,360,925 | 11/1982 | Brosnan et al. | 372/95 |
| 4,405,869 | 9/1983 | May | 359/330 |
| 4,426,155 | 1/1984 | Monchalin | 356/346 |
| 4,558,923 | 12/1985 | Hoffman et al. | 350/354 |
| 4,583,817 | 4/1987 | Papuchon | 350/96.14 |
| 4,639,923 | 1/1987 | Tang et al. | 372/21 |

OTHER PUBLICATIONS

"Laser-Cooling Limits and Single-Ion Spectroscopy," Wineland et al., Physical Review A 36, p. 2220 (Sep. 1987).

"Ultrahigh-Resolution Two-Photon Optical Ramsey Spectroscopy of an Atomic Fountain," Beausoleil and Hansch, Physicl Review A33, p. 1661 (Mar. 1986)

(List continued on next page.)

Primary Examiner—Georgia Y. Epps
Attorney, Agent, or Firm—Weingarten, Schurgin, Gagnebin & Hayes

[57] ABSTRACT

One or more optical parametric oscillators are arrayed selectively singly, serially, and/or in parallel, and each oscillator is responsive to an input pump beam having a fractional stability to produce output signal and idler beams having fractional stabilities that correspond to or are better than the fractional stability of the pump beam and in such a way that the sum of the frequencies of the output signal and idler beams of each optical parametric oscillator is constrained to be equal to the frequency of the input beam thereof. One or more beat detectors are responsive to selected one or more signal and idler beams and reference beams of already known frequency and fractional stability to provide one or more beat detection signals having linewidths corresponding to or better than the linewidths of the selected one or more signal and idler beams and reference frequency beams and in such a way that the frequency of the one or more beat detection signals is constrained to be equal to the difference in frequency between the selected one or more signal and idler beams and reference frequency beams. The sum and difference frequency constraints completely determine the absolute frequencies of the several beams thereby enabling in selected different configurations ultrahigh resolution optical frequency calibration and recalibration, broadband ultrahigh resolution frequency synthesis and, among others, wideband frequency combs of phase-locked reference frequency outputs.

4 Claims, 5 Drawing Sheets

OTHER PUBLICATIONS

"Direct Frequency Measurement of the $I_2$-Stabilized He-Ne 473-THz (633) Laser," Jennings et al., Optics Letters 8, 136 (Mar. 1983).

"Novel Optical Frequency Divider and Synthesizer," McIntyre and Hanch, *Technical Digest*, 1988 Annual Meeting of Optical Society of America, p. 131.

"Optical Parametric Oscillators," *Laser Handbook*, by Smith et. F. T. Arecchi and E. O. Schultz-Dubois (North Holland Amsterdam 1972), vol. I, pp. 837-895.

"Optical parametric Oscillators," *Treatise in Quantum Electronics*, ed. H. Rabin and C. L. Tang (Academic Press, New York, 1975) vol. I, Part B, pp. 587-703 by Byer.

"The Quantum Fluctuations of the Optical Parametric Oscillator I," by Graham and Haken Z. Physik 210, 276 (1968).

"100 GHz Bandwidth Planar GaAs Schottky Photodiode," Wong et al., Electron Lett. 19, p. 554 (Jun. 1983).

"2.5 THz Frequency Difference Measurements in the Visible Using Metal-Insulator-Metal Diodes," Drullinger et al. *Appl. Phys. Lett.* 42, p. 137 Jan. (1983).

"Beat Frequency Generation Between Visible Lasers with Frequency Differences in the 80-GHz Band," B. Burghardt, et al., *Applied Physics Letters*, 36(7), Oct. 1, 1979.

OPTICAL PARAMETRIC OSCILLATOR WIDEBAND FREQUENCY COMB GENERATOR

This invention was made with government support under Grant Number MDA 904-90-C-5070 awarded by the Maryland Procurement Office, Contact Number DAAL03-90-G-0128 awarded by the Department of the Army and under Grant Number 60NANB0D1052 awarded by the Department of Commerce. The government has certain rights in the invention.

CROSS REFERENCE TO RELATED APPLICATIONS

This invention is a continuation-in-part of co-pending, commonly-assigned, allowed U.S. utility patent Ser. No. 07/420,572, filed Oct. 12, 1989, U.S. Pat. No. 5,070,260 entitled "Ultrahigh Resolution Optical Parametric Oscillator Frequency Measurement and Synthesis System", of the same inventive entity as herein.

FIELD OF THE INVENTION

The present invention is directed to the field of optical frequency measurement and synthesis, and more particularly, to a novel ultrahigh resolution optical parametric oscillator (OPO) frequency measurement and synthesis system.

BACKGROUND OF THE INVENTION

There are a host of applications that call for ultrahigh resolution frequency measurement and synthesis ranging from optical metrology, optical frequency standards, ultrahigh resolution atomic spectroscopy, and ultrahigh resolution optical frequency and time domain multiplexing, among others. The utility of optical frequency measurement and synthesis in such applications has been limited on the one hand by the inability of the heretofore known techniques to provide frequency measurements of optical frequency sources with the same resolution as the fractional stability of the optical frequency sources, and has been limited on the other hand by the inability to provide ultrastable high resolution optical frequencies selectively at wavelengths of practical interest.

High-resolution, high-accuracy spectroscopy of laser-cooled and trapped single ions is expected to yield a resolution on the order of one part in $10^{18}$, as reported in an article entitled "Laser-Cooling Limits and Single Ion Spectroscopy", by Wineland et al., Physical Review A36, 2220 (1987), incorporated herein by reference.

Two-photon spectroscopy of an atomic fountain of neutral hydrogen atoms is expected to yield a resolution on the order of one part in $10^{15}$, as reported in an article entitled "Ultrahigh-Resolution Two-Photon Optical Ramsey Spectroscopy of an Atomic Fountain", by Beausoleil and Hänsch, Physical Review A33, 1661 (1986), incorporated herein by reference.

The highest resolution optical metrology techniques heretofore, namely those based on optical interferometric principles, however, have only been able to measure such optical frequencies with a resolution and accuracy several orders of magnitude less than the resolution with which the lines are to be provided. The limitation on measuring these lines with a resolution several orders of magnitude less than their linewidths imposed by the heretofore known optical metrology techniques has limited the exploitation of these and other sources of ultrahigh stability optical frequencies. In order to meet future requirements of $10^{-15}$, or better, resolution, non-interferometric direct frequency measurements are necessary.

A frequency synthesis chain has been demonstrated to compare the 633 nm He-Ne laser stabilized on a molecular iodine line to the primary frequency standard, the 9.2 GHz cesium clock, as reported in an article entitled "Direct Frequency Measurement of the $I_2$-Stabilized He-Ne 473-THz (633-nm) Laser", by Jennings et al, appearing at Optics Letters 8, 136 (1983), incorporated herein by reference. The utility of the frequency link, however, depends on and is thus limited by the coincidence of certain harmonics of laser and klystron sources.

Non-resonant interaction in nonlinear crystals, as suggested in an article entitled "Novel Optical Frequency Divider and Synthesizer", by McIntyre and Hänsch, appearing at Technical Digest, 1988 Annual Meeting of the Optical Society of America, p. 131, incorporated herein by reference, uses sum and difference frequency mixing in nonlinear crystals for frequency division and synthesis. This approach, however, has low efficiency and therefore has an undesirably low S/N ratio.

In many applications, such as frequency division multiple access optical communications systems, it may be important to provide a frequency comb. The individual frequencies of the comb should be known to a precision much better than the frequency separation between adjacent channel frequencies. Absolute reference frequency markers, as provided by coincident atomic or molecular lines, would be ideal but they do not occur at regular intervals. Fabry-Perot cavities or fiber ring cavities use length comparison to provide numerous frequency markers at preselected intervals, but they lack the required precision for a densely packed multichannel communication system. Over a large bandwidth, dispersion and wavelength measurement inaccuracies introduce cumulative errors that limit either the spacing or positional determination of the frequencies of the heretofore known frequency combs.

SUMMARY OF THE INVENTION

According to one object of the present invention, apparatus is disclosed for providing direct measurement of the frequency of an ultrastable frequency source with a resolution that corresponds to the fractional stability of the ultrastable frequency source. In accord with this object, among other optical metrology applications, an ultrastable optical frequency source with a fractional stability much better than that of the present cesium clock may be established as a new optical frequency standard, and the present standard may be recalibrated relative to the ultrastable optical frequency source.

According to another object of the present invention, apparatus is disclosed for providing ultrahigh precision frequency synthesis selectively over a broadband of frequencies at frequencies of practicable interest and at fractional stabilities that correspond to or are better than the fractional stability of an ultrastable optical frequency source. In accord with this object, the present invention makes possible very high resolution spectroscopy, and high resolution optical multiplexing, among other applications calling for very high resolution selected frequency synthesis.

The optical parametric oscillator frequency measurement and synthesis system of the present invention includes an optical parametric oscillator means. The optical parametric oscillator means is responsive to an input ultrastable pump beam at a frequency $\nu_p$, having a fractional stability, $\Delta\nu_p/\nu_p$, and a linewidth, $\Delta\nu_p$, to provide a pair of output signal and idler beams at frequencies $\nu_s$ and $\nu_i$ respectively. The arithmetic sum of the frequencies $\nu_s$ and $\nu_i$ of the output signal and idler beams is constrained by an arithmetic sum constraint to be equal to the frequency $\nu_p$ of the input optical beam. The frequencies $\nu_s$ and $\nu_i$ of the output signal and idler beams have stabilities at least equal to the fractional stability of the input, ultrastable pump beam. A beat detector means is responsive to the output signal and idler beams for providing a beat detection signal having a frequency $\delta$ of known sign. The frequency $\delta$ of the beat detection signal is constrained by an arithmetic difference constraint to be equal to the arithmetic difference of the frequencies $\nu_s$ and $\nu_i$ of the output signal and idler beams, with a linewidth equal to or better than the linewidths of the frequencies $\nu_s$ and $\nu_i$ of the output signal and idler beams. Feedback means are coupled between the detector means and the optical parametric oscillator means. The feedback means is responsive to the beat detection signal for phase-locking the optical parametric oscillator means at the resonant frequencies $\nu_s$ and $\nu_i$ of the signal and idler beams, and thereby stabilizing the difference frequency between $\nu_s$ and $\nu_i$.

In one frequency measurement embodiment, the signal or idler output is phase-locked to an already known frequency of a reference frequency source. The sum and difference frequency constraints thereby determine the frequency of the input beam, and in such a way that the resolution thereof corresponds to the fractional stability of the input optical frequency.

In one frequency synthesis embodiment, the frequency of the input beam and its fractional stability are already known, as the source therefor is either a standard itself, or has been compared with a standard. The beat detection signal, together with the sum and difference frequency constraints, thereby enables to determine the frequencies of the signal and idler beams, and in such a way that the resolution thereof corresponds to the fractional stability of the already known input frequency beam.

In a further disclosed embodiment, plural optical parametric oscillator means are arrayed in series and are arranged in one or more serial stages. The serial stages of series-connected optical parametric oscillator means provide selected broadband direct frequency measurement and synthesis.

In yet a further disclosed embodiment, plural optical parametric oscillator means are arrayed in parallel and arranged in one or more serial stages. The serial stages of parallel-connected oscillator means provide selected broadband direct frequency measurement and/or synthesis.

In each of the several embodiments, the beat detector means includes a high bandwidth photodetector.

According to another object of the present invention, apparatus is disclosed for providing a wideband comb of selectable optical frequencies such that each frequency of the comb is precisely known and exhibits a fractional stability that corresponds to or is better than the fractional stability of a reference optical frequency and in such a way that the interfrequency spacings of adjacent frequencies of the comb are precisely known. In accord with this object, the present invention makes possible, among others, high capacity frequency division multiple access optical communications.

BRIEF DESCRIPTION OF THE DRAWINGS

These and other objects, advantages, and features of the present invention will become apparent as the invention becomes better understood by referring to the following solely exemplary and non-limiting detailed description of the preferred embodiments thereof, and to the drawings, wherein.

DETAILED DESCRIPTION OF THE PREFERRED EMBODIMENTS

Figure 1:
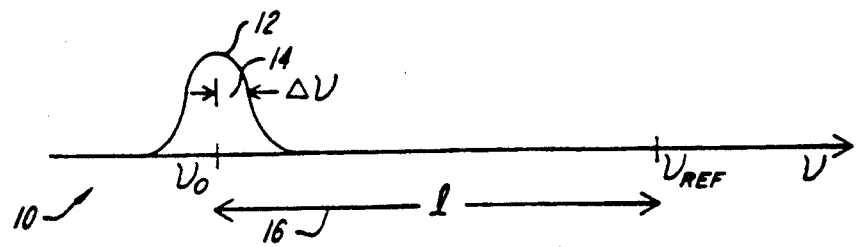
FIG. 1 is a frequency diagram that is useful in explaining the direct frequency measurement capability of the ultrahigh resolution optical parametric oscillator frequency measurement and synthesis system of the present invention.

Referring now to FIG. 1, generally designated at 10 is a frequency graph useful in explaining the direct frequency measurement of the ultrahigh resolution optical parametric oscillator frequency measurement and synthesis system according to the present invention. A curve 12 represents the frequency spectrum of an exemplary optical radiation source plotted along a frequency axis. The frequency spectrum 12 has a linewidth (half width at half maximum), marked $\Delta \nu$, illustrated by a double headed arrow 14, and a center frequency, marked $\nu_o$, on the frequency axis.

For the exemplary ultrastable source of optical radiation, the center frequency, $\nu_o$, of the radiation source as measured by the heretofore known interferometric techniques, is of the order of $10^{15}$ Hz, known to an accuracy of about one part in $10^9$. The measured linewidth, $\Delta \nu$, for such an exemplary source is about one millihertz. The fractional stability, defined as the ratio of the linewidth, $\Delta \nu$, to the line center frequency, $\nu_o$, is, then, about $10^{-18}$. Heretofore, as illustrated by a line 16 designated "1", it has not been possible to provide a direct measure of the center frequency, $\nu_o$, relative to a reference frequency, marked $\nu_{ref}$, with a resolution that corresponds to the fractional stability of the source frequency, $\Delta \nu/\nu$, or of the reference frequency, $\Delta \nu_{ref}/\nu_{ref}$, whichever is the larger, and with an accuracy that corresonds to the linewidth of the source frequency, $\Delta \nu$, or of the reference frequency, $\Delta \nu_{ref}$, whichever is the larger.

Figure 2A:
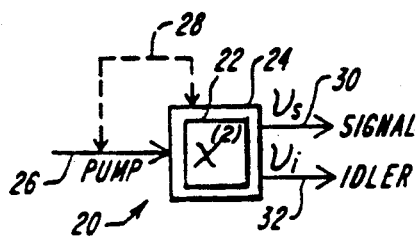
FIG. 2 shows schematic diagrams in FIGS. 2A, 2B thereof that are useful in explaining the optical parametric oscillator operational characteristics of the ultrahigh resolution optical parametric oscillator frequency measurement and synthesis system of the present invention.
Figure 2B:
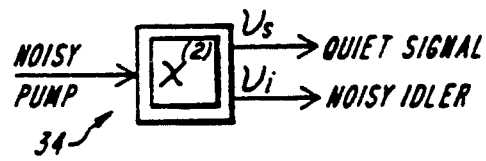

Referring now to FIG. 2A, generally designated at 20 is a schematic diagram of an optical parametric oscillator. The oscillator 20 includes a non-linear crystal 22, marked "$\chi^{(2)}$", that is located within an optically resonant cavity 24. Any suitable crystal 22 that has a non-zero second-order non-linear susceptibility, and that exhibits good crystal quality, a high damage threshold, and that can be phase matched, such as LiNbO$_3$:MgO, and KTP, may be employed.

A pump laser beam or other coherent radiation 26 is input into the cavity 24. Any suitable pump laser or radiation source, either continuous wave or pulsed, may be employed. The oscillator cavity 24 includes two spaced cavity mirrors, not shown, and it may be selected to be operative in either a singly or a doubly resonant mode. The pump laser beam 26 and the oscillator cavity 24 are phase-locked or are frequency-locked, as illustrated in dashed line 28, to establish and maintain selected-mode cavity oscillation.

The photons of the input pump beam 26 interact parametrically in the $\chi^{(2)}$ crystal 24 and are converted thereby into two output photons. Two output signal and idler beams 30, 32 exit the cavity 24 that exhibit a high degree of spatial and temporal coherence. The frequencies marked "$\nu_s$, $\nu_i$" of the output signal and idler beams 30, 32 are selectable to provide tuned radiation at frequencies over a broad range of frequencies from the ultraviolet to the infrared. Like a laser, only one signal and idler mode pair oscillates above threshold, as the parametric gain provided by the crystal 24 is suppressed for other mode pairs.

Tuning to select a particular mode pair of signal and idler frequencies in either the singly resonant or doubly resonant modes may be accomplished in a number of ways, as by changing the cavity length with a servo-controlled PZT element, not shown, that is mounted to one of the cavity mirrors, by changing the temperature of the non-linear crystal 24 via a controllable temperature oven, not shown, and by changing the electric field, not shown, applied through the crystal. Tuning can also be accomplished by techniques external to the cavity 24, as by changing the pump laser frequency. Reference may be had to an article entitled: "Optical Parametric Oscillators", by Smith, appearing in *Laser Handbook*, edited by F. T. Arecchi and E. O. Schulz-Dubois, (North-Holland, Amsterdam, 1972), Vol./I, pages 837-895, and to an article of the same title by Byer, appearing in *Treatise in Quantum Electronics*, edited by H. Rabin and C. L. Tang (Academic Press, New York, 1975.) Vol. I, part B, pages 587-703, both incorporated herein by reference, for a further description of optical parametric oscillator tuning, mode-choice, crystal types and, among others, principles of operation.

The fundamental limitation on the linewidth of the signal and idler beams is imposed by the linewidth of the pump laser beam 26 and by the quantum phase diffusion noise of the optical parametric oscillator 20. When the optical parametric oscillator is operated at or around degeneracy, the frequencies of the signal and idler beams 30, 32 are very close, and the linewidths of the signal and idler beams 30,32 are virtually equal. For the case of perfect phase matching without frequency detuning, the linewidth of the signal or idler beams 30, 32 has two noise sources, the phase fluctuation noise of the pump laser, $\phi_1 + \phi_2$, and the phase diffusion noise of the phase difference, $\phi_1 - \phi_2$, and is given by the following relation:

$$\Delta \nu_{1,2} = \frac{\kappa_{1,2}^2}{(\kappa_1 + \kappa_2)^2} \Delta \nu_p + \frac{h\nu_{1,2}}{P_{1,2}} \frac{(\kappa_1 \kappa_2)^2}{(\kappa_1 + \kappa_2)^2} (\bar{n}_1 + \bar{n}_2 + 1) \quad (1)$$

where $\kappa$ is the decay constant of the cold cavity, $\bar{n}$ is the average thermal photon number, $\nu$ is the output frequency, and P is the output power, and where the subscripts 1,2, and p refer to the signal, idler, and pump, respectively. For nearly degenerate operation, $\nu_1 \sim \nu_2 \sim \frac{1}{2}\nu_p$, $\kappa_1 = \kappa_2$, and $\bar{n}_1 = \bar{n}_2 << 1$ for optical frequencies, so that relation (1) can be reduced to:

$$\Delta \nu_1 = \Delta \nu_2 = \frac{1}{4} \Delta \nu_p + \left( \frac{h\nu_1 \kappa^2}{4P_1} \right). \quad (2)$$

The first term on the right hand side of relation (2) is that part of the linewidth due to the pump laser linewidth, and the second term is that due to the quantum phase diffusion.

With respect to the first term, the fractional stability, $\Delta \nu_1/\nu_1$, which is $\frac{1}{2}(\Delta \nu_p/\nu_p)$ therefor, is a factor of two better than that of the pump itself. The apparent improvement seems to be the result of having the fractional stability of the pump $\Delta \nu_p/\nu_p$ split equally between the signal and idler beams. Thus, the fractional stability of the pump beam 26 is transferred to the signal and idler beams 30, 32 without degradation, so that the measurement resolution of the signal and idler beams is only limited by the fractional stability, $\Delta \nu_p/\nu_p$, of the pump.

With respect to the second term, an example may help to clarify the noise contributed by quantum phase diffusion. For an exemplary signal beam output frequency "$\nu$" of $3 \times 10^{14}$ Hz, an output power "P" of 1 mW, and a cold cavity linewidth "$\kappa$" of 5 MHz, the linewidth due to phase diffusion is 1 mHz, and the diffusion-limited fractional stability is 3 parts in $10^{17}$. As will be appreciated by those skilled in the art, the quantum phase diffusion linewidth is negligible relative to the pump laser linewidth, for any presently available laser.

When narrower linewidth lasers are developed in the future, it is possible to change the operating conditions of the optical parametric oscillator 20, such as by selecting a higher output power or by selecting a higher cavity finesse, to make the quantum phase diffusion noise contribution much smaller than the pump laser linewidth.

For operation away from degeneracy, the frequencies of the signal and idler beams 30, 32 are more widely separated, and the linewidths of the signal and idler beams 30, 32 can be selected such that the linewidth of the signal beam 30 is much narrower than that of the idler beam 32, or vice versa, by selecting unequal cold cavity decay constants. In this way, higher and lower finesse output beams may be provided, with the linewidth for the higher finesse output beam being selected to be significantly smaller than the linewidth for either the pump or the lower finesse beam, thereby providing a very stable tunable output beam not limited by the pump laser linewidth as generally shown at 34 in FIG. 4B.

The mechanism by which the asymmetric distribution of the phase diffusion noise is possible is reflected in the phase variable, $\phi$. The phase variable $\phi$, which undergoes phase diffusion and is not affected by the component of the noise attributable to the pump, is given by the relation:

$$\phi = \left(\frac{\kappa_2}{\kappa_1}\right)^{\frac{1}{2}} \phi_1 - \left(\frac{\kappa_1}{\kappa_2}\right)^{\frac{1}{2}} \phi_2, \tag{3}$$

where the "$\kappa$'s" refer to the decay constants of the cold cavity of the optical parametric oscillator. For a selected asymmetric distribution of the quantum phase diffusion noise, the linewidths of the output signal and idler beams are shown in relation (1), above. As an example, a 10:1 ratio in the signal and idler cold cavity decay rates results in a 90 Hz pump-induced linewidth for a pump linewidth of 10k Hz. This should be compared with a 2.5k Hz linewidth if the decay constants are equal. Coupled with the high conversion efficiency of the optical parametric oscillator, very efficient generation of tunable sources with extremely narrow linewidths for ultra-high resolution spectroscopy are thereby made possible. Reference may be had to an article entitled "The Quantum Fluctuations of the Optical Parametric Oscillator. I", by Graham and Haken, appearing at Z. Physik 210, 276 (1968), incorporated herein by reference, for a detailed theoretical treatment of optical parametric oscillator noise characteristics.

Figure 3:
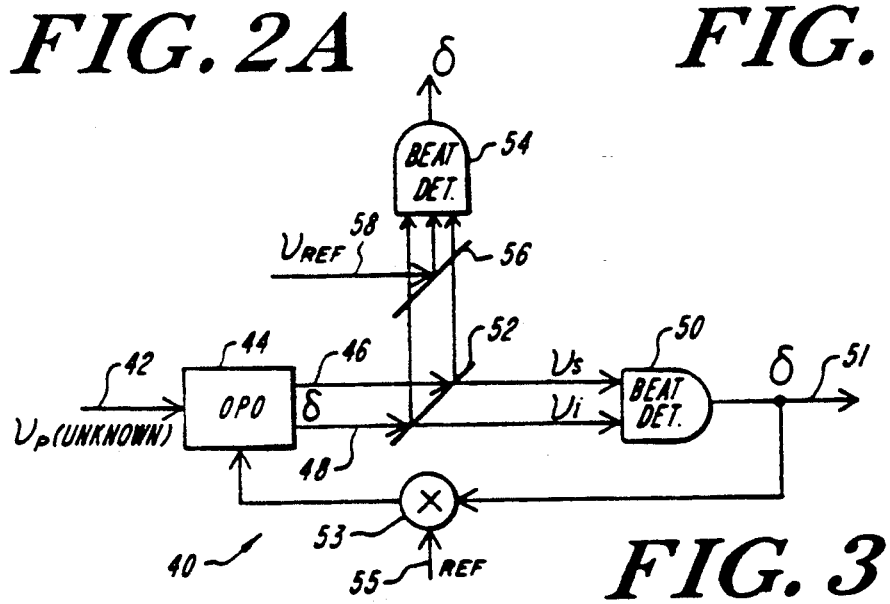
FIG. 3 is a block diagram illustrating one optical metrology embodiment of the ultrahigh resolution optical parametric oscillator frequency measurement and synthesis system of the present invention.

Referring now to FIG. 3, generally designated at 40 is a schematic diagram of one optical metrology embodiment of the ultrahigh resolution optical parametric oscillator frequency measurement and synthesis system according to the present invention. An optical frequency beam 42 is provided by an ultrastable optical frequency source, not shown. In this metrology embodiment, the optical frequency "$\nu_p$" thereof is to be determined with a resolution that corresponds to the fractional stability of the ultrahigh stability optical frequency source.

The beam 42 is input into an optical parametric oscillator (OPO) 44. The OPO 44, operated at or around degeneracy, produces two optical frequency output signal and idler beams 46, 48 that are comparatively close in frequency and separated in frequency by a selected frequency difference marked "$\delta$" selected to be approximately an integral number multiple of the free spectral range of the OPO cavity.

The fractional stability of the pump beam is tranferred to the signal and idler beams 46, 48, and the pump noise is roughly evenly divided to the signal and idler beams 46, 48. In this embodiment, the OPO 44 is preferably operated to provide approximately equal phase diffusion noise contributions to the signal and idler beams 46, 48.

The output signal and idler beams 46, 48 are coupled along an optical path to a beat detector 50. The beat detector 50 is selected to be an ultrahigh speed photodetector, such as the 10–20 GHz photodetector commercially available from Hewlett-Packard or from British Telecom & Dupont (BT&D), the GaAs photodetectors having a $-3$ dB response at 100 GHZ reported in an article entitled "100 GHz Bandwidth Planar GaAs Schottky Photodiode", by Wang et al. appearing at Electron. Lett. 19, 554 (1983), incorporated herein by reference, or, among others, the point contact diodes responsive to beat frequencies up to 2.5 THz, with an expected response of 30 THz, as reported in an article entitled "2.5 THz Frequency Difference Measurements in the Visible Using Metal-Insulator-Metal Diodes", by Drullinger et al, appearing at Appl. Phys. Lett. 42, 137 (1983), incorporated herein by reference. It should be noted that although the intrinsic tuning range of the OPO 44 is large, the OPO is selectively operated at or around degeneracy to accommodate the bandwidth provided by the presently available beat detector technology.

The output of the beat detector 50, designated "$\delta$", is given by the relation:

$$\delta = \nu_s - \nu_i. \tag{4}$$

Any suitable technique may be employed to determine the sign of $\delta$, as by selectively frequency-shifting the signal or the idler beams with an acousto-optic modulator, not shown, positioned in the optical path of the selected beam under control of a known radio frequency and monitoring the corresponding shift in the beat frequency.

The output signal 51 of the beat detector 50 designated "$\delta$" is mixed in a mixer 53 with a reference signal 55, marked "ref", and fed back to any selected tuning mechanism for the optical parametric oscillator 48 to establish and maintain resonance lock at the selected frequencies of the signal and idler beams. The reference signal 55 may be any suitable radio frequency or microwave frequency tunable reference.

A beam splitter 52 is interposed along the optical path of a selected one of the signal and idler beams 46, 48, and it partially reflects that beam along an optical path and onto a beat detector 54. A beam splitter 56 is interposed along the optical path of the selected one of the signal and idler beams. A known-frequency reference beam 58, produced by an already-known frequency reference source, is split off the beam splitter 56 and onto the beat detector 54. The output of the beat detector 54, marked "$\delta^*$", is given by the relation:

$$\delta^* = \nu_{ref} - \nu_{s,i}. \tag{5}$$

The sign of $\delta^*$ is determined in any suitable manner.

Since $\delta$ is known by having been measured in the beat detector 50, and because the selected one of the signal and idler frequencies, $\nu_{s,i}$, is known through its having been measured in the beat detector 54, both the signal and the idler beam frequencies $\nu_i$, $\nu_s$ are thereby known. The absolute frequency of the pump beam $\nu_p$ is thereby known, because energy conservation requires that the sum of the signal and idler frequencies be equal to the pump frequency.

In operation, the stability of the pump is transferred to the signal and idler beams as discussed above. The noise component induced by the pump splits substantially evenly into the signal and idler beams and cancels itself out in the beat detector 50. Thereby, the linewidth of the beat detector signal 51 of the signal and idler beams 46,48 is only limited by the quantum phase diffusion noise. As discussed above, the quantum phase diffusion noise can be made to be negligibly small. In this way, the absolute frequency position of the unknown frequency input beam relative to the frequency reference is thereby known with a resolution that corresponds to the fractional stability of the input beam.

Figure 4:
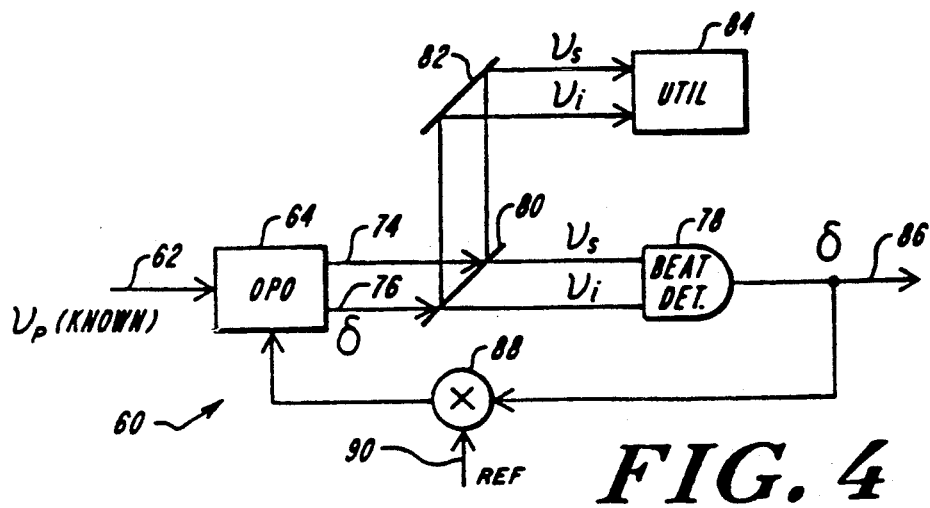
FIG. 4 is a block diagram illustrating one frequency synthesis embodiment of the ultrahigh resolution optical parametric oscillator frequency measurement and synthesis system of the present invention.
Figure 5A:
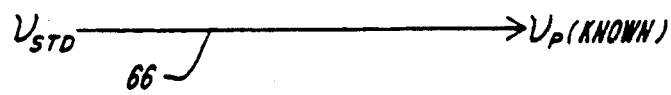
FIG. 5 shows block diagrams in FIGS. 5A, 5B thereof illustrating alternative input beam implementations of the FIG. 4 embodiment of the ultrahigh resolution optical parametric oscillator frequency measurement and synthesis system of the present invention.
Figure 5B:
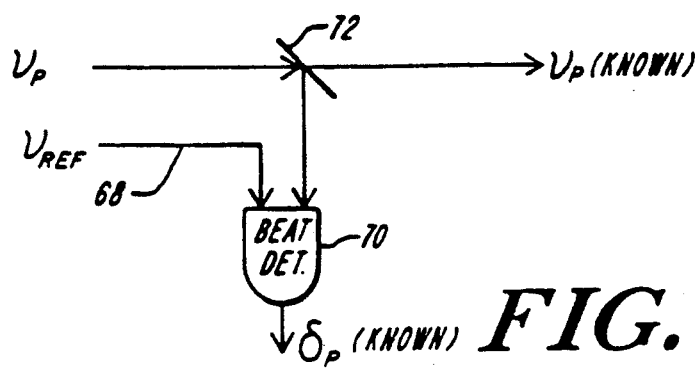

Referring now to FIG. 4, generally designated at 60 is a frequency synthesis embodiment of the ultrahigh resolution optical parametric oscillator frequency measurement and synthesis system of the present invention. In this embodiment, an input pump beam 62 of a known frequency, "$\nu_p$", is input into an optical parametric oscillator 64. As shown by a line 66 in FIG. 5A, the input frequency $\nu_p$ of the input beam is known, as it itself is an already known frequency, "$\nu_{std}$", of a preselected frequency standard. As shown in FIG. 5B, the known frequency of the input optical beam is known by having compared it already with a frequency beam 68 of a known frequency, "$\nu_{ref}$", of a preselected frequency standard. The input pump beam to be known is split off onto a beat detector 70 via a beam splitting element 72 interposed in the optical path of the input frequency beam. From the measured beat detector signal, marked "$\delta_{p(known)}$", the frequency of the pump beam, marked "$\nu_{p(known)}$", is known.

The optical parametric oscillator 64 is operated at or around its degeneracy point, and it parametrically downconverts the input frequency of known frequency "$\nu_p$" into two output frequency signal and idler beams 74, 76 of frequencies $\nu_s$ and $\nu_i$ that are close in frequency and separated by a frequency difference marked "$\delta$". Energy conservation considerations require that the sum of the frequencies of the signal and idler beams 74, 76, be equal to the frequency $\nu_p$ of the input optical frequency beam 62.

The signal and idler beams are coupled along an optical path to a beat detector 78. The beat detector 78 may be of any suitable type that has a bandwidth sufficient to respond to the difference frequency "$\delta$" between the signal and idler beams 74, 76, and may be any of the types described above in connection with the description of the FIG. 3 embodiment. The beat detector may include a high-frequency electro-optic modulator or other device that puts sidebands onto the signal and/or idler output beams. By measuring the frequency difference between a sideband of the signal beam and a sideband of the idler beam the difference frequency between the signal and idler beams can be precisely determined. The sign of "$\delta$" may be determined in any suitable manner, as by the technique described above in connection with the description of FIG. 3.

A beam splitter 80, interposed along the optical path of the signal and idler beams 74, 76, partially reflects the signal and idler beams onto a mirror 82. The mirror 82, in turn, reflects the selected one of the signal and idler beams onto a utilization device 84.

The output signal 86 of the beat detector 78 designated "$\delta$" is mixed in a mixer 88 with a reference signal 90, marked "ref", and fed back to any selected tuning mechanism for the optical parametric oscillator 64 to establish and maintain resonance lock at the selected frequencies of the signal and idler beams. The reference signal 90 may be any suitable radio frequency or microwave frequency tunable reference.

In operation, the fractional stability of the input pump beam is preserved in the optical parametric oscillator 64 and is transferred to the signal and idler beams 74, 76. The component of the noise attributable to the pump noise is self-cancelling, as a result of the beat detection provided by the beat detector 78, and the component of the noise attributable to quantum phase diffusion noise can be made negligibly small.

Since $\nu_p$ is known, and is known by the sum frequency constraint to be equal to the sum of the frequencies $\nu_s$ and $\nu_i$ of the signal and idler beams 74, 76, and since the difference "$\delta$" between the frequencies $\nu_s$, $\nu_i$ of the signal and idler beams 74, 76 is measured by the beat detector 78, the frequency of any selected one of the signal and idler beams is thereby established with a resolution that corresponds to, or better than, the fractional stability of the input frequency beam 62 at the known frequency $\nu_p$. If, then, the utilization device 84 is a spectroscopic utilization device, the selected one of the signal and idler beams thereby enables ultrahigh resolution spectroscopic measurements. If the utilization device 84 is an optical processing utilization device, the selected one of the signal and idler beams thereby enables to provide, for example, ultrahigh stability time or frequency baselines. Other applications will be readily apparent to those skilled in the art.

Figure 6A:
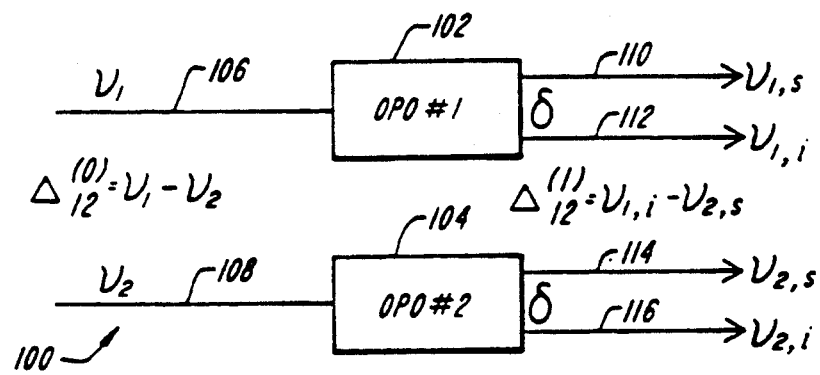
FIG. 6 shows a block diagram in FIG. 6A thereof and a frequency graph in FIG. 6B thereof illustrating one serial stage of a parallel-connected embodiment of the ultrahigh resolution optical parametric oscillator frequency measurement and synthesis system of the present invention.

Referring now to FIG. 6, generally designated at 100 in FIG. 6A is a parallel-connected embodiment of the ultrahigh resolution optical parametric oscillator frequency measurement and synthesis system of the present invention. Two OPO's 102, 104 are arrayed in parallel, and constitute a stage of a single or multiple stage ultrahigh resolution optical frequency measurement and synthesis system. Two input optical frequencies marked "$\nu_1$" and "$\nu_2$" of two ultrahigh stability optical frequency beams 106, 108 are input to the OPO's 102, 104. The initial frequency difference, marked "$\Delta^{(0)}_{12}$", therebetween is equal to $\nu_1 - \nu_2$, as marked.

Figure 6B:
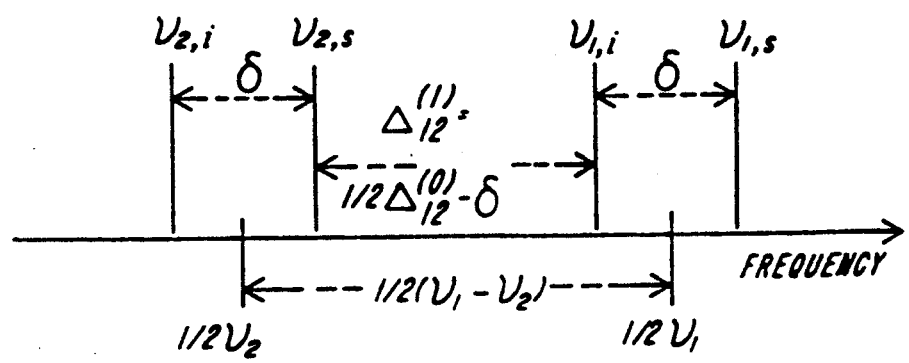

As shown in FIG. 6B, the OPO's 102, 104 are each operated to provide a signal and idler difference frequency of $\delta$ respectively between the signal and idler beams 110, 112 marked "$\nu_{1,s}$, $\nu_{1,i}$" of the OPO 102 and the signal and idler beams 114, 116 marked "$\nu_{2,s}$, $\nu_{2,i}$" of the OPO 104. The smallest frequency difference, marked "$\Delta^{(1)}_{12}$", between the several outputs of the parallel OPO's 102, 104 is equal to $\frac{1}{2}\Delta^{(1)}_{12} - \delta$, as marked. For n stages, then, the frequency difference after the nth stage is given by the relation:

$$\Delta^{(n)}_{12} = \frac{1}{2} \Delta^{(n-1)}_{12} - \delta^{(n)}, \quad (6)$$

where $\delta^{(n)}$ is the frequency difference of the signal and idler beams of the nth stage. As an example, the frequency difference between 0.633 mm and 0.532 mm is about 90 THz. After passing through 5 stages of frequency division, each with $\delta = 1$ THz, the difference frequency is reduced to 0.9 THz, a frequency that is measurable by the bandwidth provided by presently available photodetector technology.

Figure 7A:
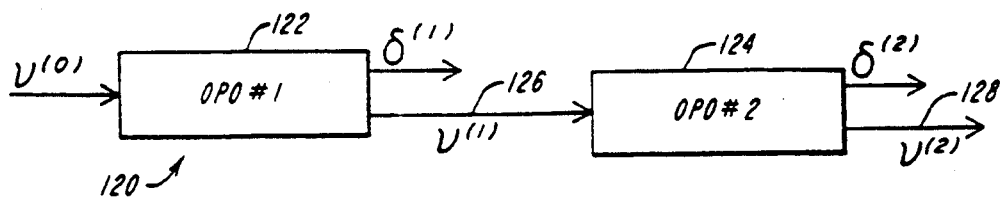
FIG. 7 shows a block diagram in FIG. 7A thereof and a frequency graph in FIG. 7B thereof illustrating one serial stage of a serially-connected embodiment of the ultrahigh resolution optical parametric oscillator frequency measurement and synthesis system of the present invention.

Referring now to FIG. 7, generally designated at 120 in FIG. 7A is a serially-connected embodiment of the ultrahigh resolution optical parametric oscillator frequency measurement and synthesis system of the present invention. Two OPO's 122, 124 are arranged in series, and constitute a stage of a single or multiple stage ultrahigh resolution optical frequency measurement and synthesis system. The OPO's 122, 124 are each operated to provide a signal and idler difference frequency of $\delta$ between the signal and idler beams thereof marked "$\delta^{(1)}$, $\delta^{(2)}$".

Figure 7B:
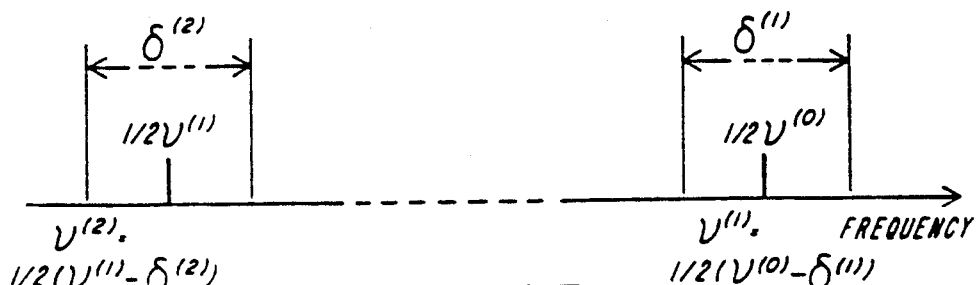

As shown in FIGS. 7A, 7B, the lower frequency output beam 126 of the OPO 122 marked "$\nu^{(1)}$" is fed as an input to the OPO 124, and the lower frequency output beam 128 thereof marked "$\nu^{(2)}$" is fed as an input to any next stage OPO of a multistage array of serially-connected optical parametric oscillators. The output frequency $\nu^{(1)}$ of the lower frequency output beam 126 of the first OPO 122 is given by the relation:

$$\nu^{(1)} = \frac{1}{2}(\nu^{(0)} - \delta^{(1)}), \quad (7)$$

and, the frequency $\nu^{(2)}$ of the lower frequency output beam 128 of the second OPO 124 is given by the relation:

$$\nu^{(2)} = \frac{1}{2}(\nu^{(1)} - \delta^{(2)}). \quad (8)$$

For n stages, then, the frequency difference after the $n^{th}$ stage is given by the relation:

$$\nu^{(n)} = \frac{1}{2}(\nu^{(n-1)} - \delta^{(n)}). \quad (9)$$

Assuming $\delta$'s of about 1 THz, a 500 THz (0.6 mm) input frequency beam will be reduced to less than one THz in frequency after 9 stages, which is measurable by the bandwidth provided by the presently available beat detector technology.

Figure 8:
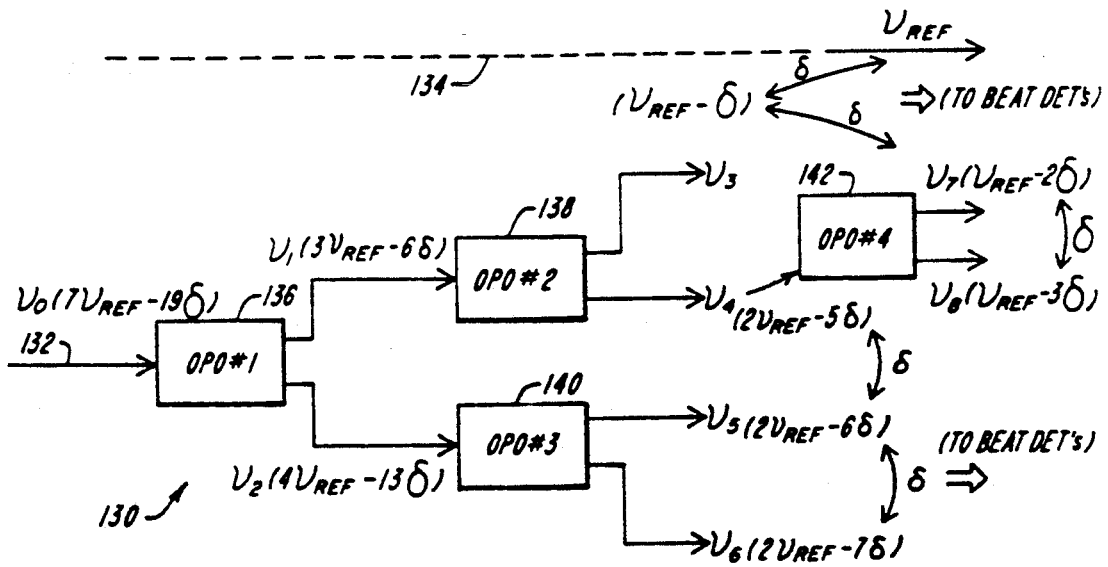
FIG. 8 is a block diagram illustrating an exemplary use of the ultrahigh resolution optical parametric oscillator frequency measurement and synthesis system in accordance with the present invention.

Referring now to FIG. 8, generally designated at 130 is a block diagram illustrating the use of four OPO's in accordance with the ultrahigh resolution optical parametric oscillator frequency measurement and synthesis system of the present invention to provide an absolute frequency measure of the 2-photon transition line of the hydrogen atom. For this example, the ultrastable input frequency marked "$\nu_o$" is 616.5138963 THz, the 1S-2S 2-photon transition at 243 nm doubled, and the reference frequency marked "$\nu_{ref}$" is 88.376181608 THz, the 3.39 nm He-Ne laser locked to a $CH_4$ resonance, that has a fractional stability of $+/-1.3(10^{-10})$. The ratio of the input frequency $\nu_o$ to the reference frequency $\nu_{ref}$ is roughly a factor of 7 for this example.

As shown in FIG. 8, four optical parametric oscillators 136, 138, 140, and 142 are arranged in series and in parallel and are operated to respectively provide the frequencies $\nu_1$, $\nu_2$; the frequencies $\nu_3$, $\nu_4$; the frequencies $\nu_5$, $\nu_6$; and the frequencies $\nu_7$, $\nu_7$. The corresponding frequency values are indicated in the parenthesis adjacent thereto, where $\delta$ is equal to $1/19\,(7\nu_{ref} - \nu_o)$, on the order of 111 GHz, well-within the bandwidth provided by the presently available beat detector technology. Other frequency values and difference frequencies may be selected so long as the beat frequencies indicated with a "$\delta$" are within the bandwidth of the presently available detector technology.

Each pair of signals joined by the arrows marked with a "$\delta$" is phase-locked, so that the direct frequency comparison between $\nu_o$ and $\nu_{ref}$ is reduced to measuring the five beat detector signals marked. In the prior art by contrast, comparing the two-photon line transition of the hydrogen atom with the exemplary reference frequency has heretofore not been possible.

Figure 9B:
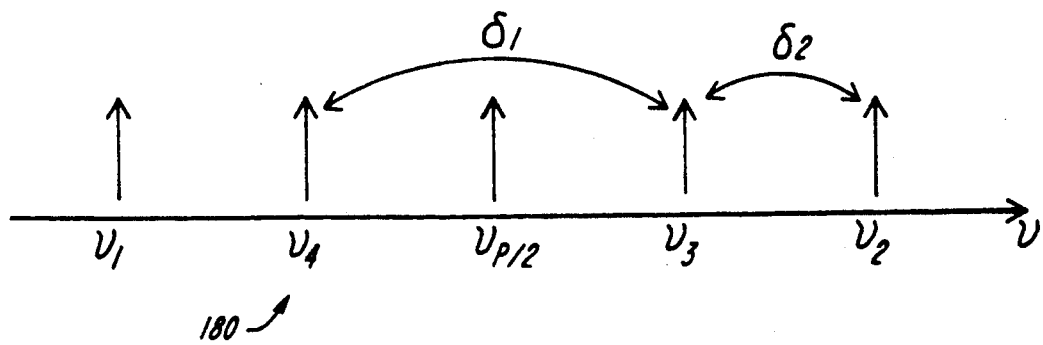
FIG. 9 illustrates in the FIGS. 9A and 9B thereof a block diagram and a frequency graph illustrating one OPO-based wideband frequency comb generator embodiment in accord with the present invention.
Figure 9A:
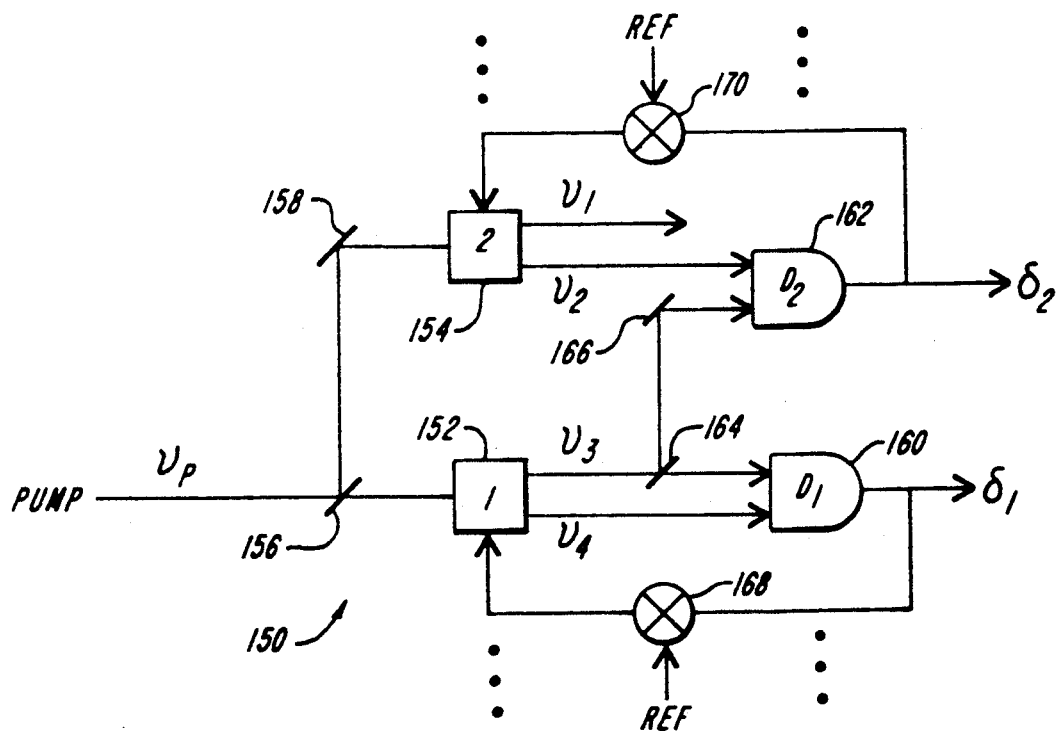

Referring now to FIG. 9A, generally designated at 150 is one embodiment of an OPO-based optical frequency comb generator in accord with the present invention. The OPO-based optical frequency comb generator 150 includes a first optical parametric oscillator (OPO) 152 designated "1" in parallel with a second optical parametric oscillator (OPO) 154 designated "2". The OPO's 152, 154 are fed by a pump laser having a frequency $\nu_p$, the OPO 152 receiving that portion of the pump beam that passes directly through a splitter 156, and the OPO 154 receiving the pump beam along an optical train that includes the beam splitter 156 and a reflector 158. While two OPO's are illustrated, more than two OPO's may be employed without departing from the inventive concept.

The optical parametric oscillators 152, 154, operated at or around degeneracy, produce in response to the input pump beam respective pairs of optical frequency output signal and idler beams designated "$\nu_3$", "$\nu_5$", and "$\nu_1$", "$\nu_2$". The difference in frequency of the pairs of optical frequency output signal and idler beams is selected to be approximately an integral number multiple of the free spectral range of the respective cavities of the OPO's 152, 154. As described above, the fractional stability of the pump beam is transferred to the pairs of signal and idler beams, the pump noise is roughly evenly divided to the signal and idler beams of the pairs of signal and idler beams, and the quantum phase diffusion noise may be made to be arbitrarily low.

A first beat detector 160 marked "$D_1$" is coupled along an optical path to receive the signal and idler beams $\nu_3$, $\nu_4$ of the OPO 152, and a second beat detector 162 marked "$D_2$" is coupled along an optical path including splitters 164, 166 to receive the idler beam $\nu_2$ of the OPO 154 and the signal beam $\nu_3$ of the OPO 152. The beat detectors 160, 162 may be any suitable beat detectors known to those skilled in the art, such as those identified and described hereinabove.

The output of the beat detector 160, designated "$\delta_1$", is given by the relation:

$$\delta_1 = \nu_3 - \nu_4, \quad (10)$$

and the output of the beat detector 162, designated "$\delta_2$", is diven by the relation:

$$\delta_2 = \nu_2 - \nu_3. \quad (11)$$

Any suitable technique may be employed to determine the signs of the $\delta$'s in the equations 10 and 11 as by selectively frequency-shifting the signal or the idler beams with an acoustic-optic modulator, not shown, positioned in the optical path of the selected beam under control of a known radio frequency and monitoring the corresponding shift in the beat frequency.

The output signals $\delta_1$, $\delta_2$ of the beat detectors 160, 162 are respectively mixed in mixers 168, 170 with reference signals marked "ref" and fed back to any selected tuning mechanism for the optical parametric oscillators 152, 154 to establish and maintain resonance lock at the selected frequencies of the signal and idler beams. As in the embodiments described hereinabove, the reference signal may be any suitable radio frequency or microwave frequency tunable reference. As in the embodiments described hereinabove, the input beam of frequency $\nu_p$ may be an already known optical frequency reference, or it may be known by comparison to an already known frequency reference. As in the embodiments described hereinabove, the fractional stabilities of the pairs of signal and idler beams equal or are better than the fractional stability of the input optical frequency beam.

With the number of OPO's being equal to the number of beat detectors, the arithmetic sum and difference constraints imposed by the beat detectors and by energy conservation at the OPO's ensure that both the individual frequencies of the comb and the interfrequency spacing are precisely known as illustrated generally at 180 in FIG. 9(B).

Figure 10A:
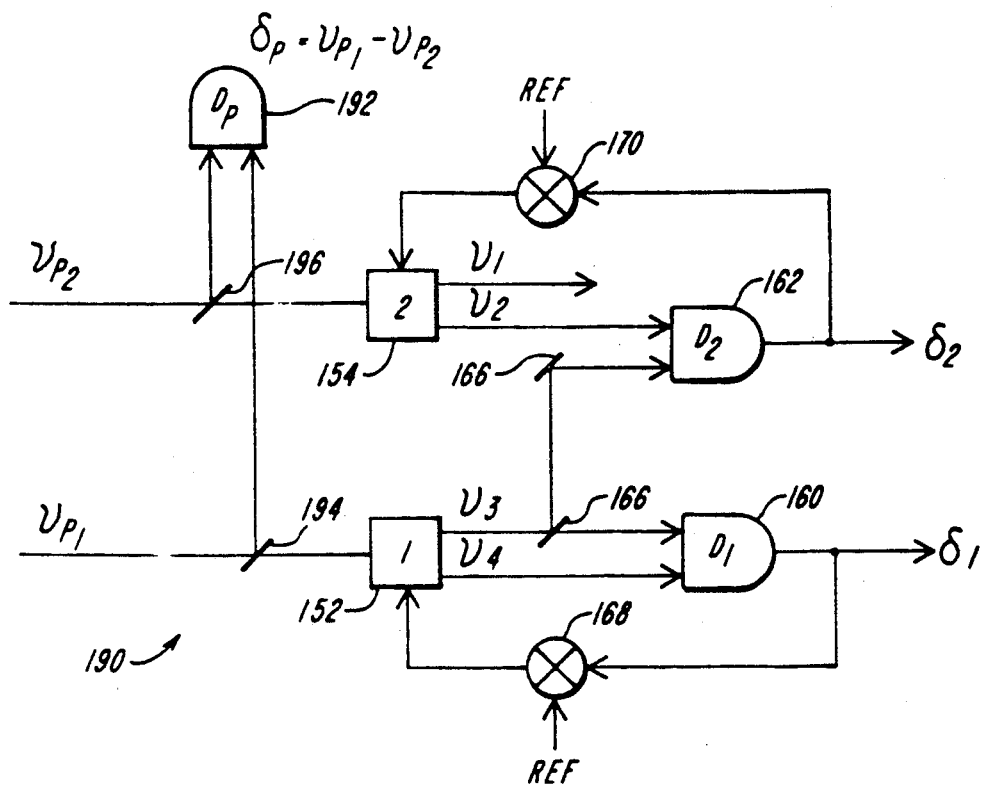
FIG. 10 illustrates in the FIGS. 10A and 10B thereof a block diagram and a frequency graph illustrating another embodiment of an OPO-based wideband frequency comb generator in accord with the present invention.

Referring now to FIG. 10A, generally designated at 190 is another embodiment of an OPO-based frequency comb generator in accord with the present invention. The elements thereof that are the same as that of the embodiment 150 of FIG. 9A bear corresponding numbers and are not again described herein for the sake of brevity of explication. The embodiment 190 of FIG. 10A differs from the embodiment 150 of FIG. 9A in the primary respect that the OPO 154 is pumped by a pump laser of a frequency marked "$\nu_{p1}$" while the OPO 154 is pumped by a pump laser of a frequency marked "$\nu_{p2}$" that is different from the frequency $\nu_{p2}$ of the pump of the OPO 152. The frequencies $\nu_{p1}$ and $\nu_{p2}$ need not, of course, be produced by separate and independent pump lasers, but may be related frequencies, such as those that would be produced by an upstream frequency dividing optical parametric oscillator, not shown, or by two phase-locked lasers with a known beat frequency, or by the same laser with an electro-optic modulator, among others.

Figure 10B:
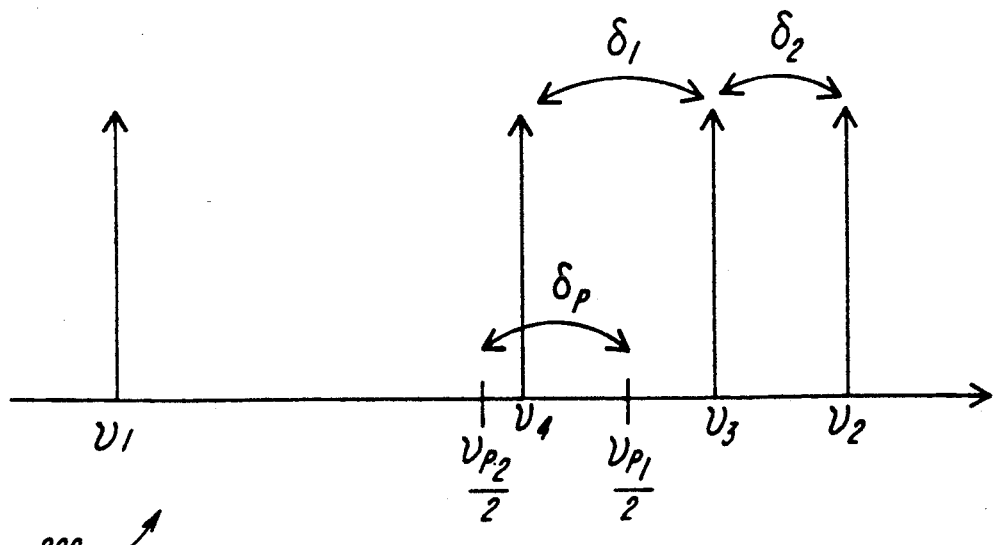

A beat detector 192 marked "$D_p$" is optically coupled to the input pump beams of frequencies $\nu_{p1}$ and $\nu_{p2}$ via beam splitting elements 194, 196. The beat detector 192 provides a beat frequency measurement signal marked "$\delta_p$" between the two input pump beams marked "$\nu_{p1}$-$\nu_{p2}$". The OPO-based frequency comb generator 190 produces the comb of frequencies illustrated generally at 200 in FIG. 10B in the same way that the embodiment 150 of FIG. 9A produces the comb 180 of FIG. 9B. The embodiment 190 of FIG. 10A provides the comb of frequencies 200 that differs from the comb of frequencies 180 (FIG. 9B) inasmuch as the comb is distributed about the frequencies of the input pump beams, as illustrated, with precisely known frequencies and interfrequency spacings.

Many modifications of the presently disclosed invention will become apparent to those skilled in the art without departing from the scope of the appended claims.

What is claimed is:

1. An OPO-based wideband comb generator, comprising:

at least two optical parametric oscillator means responsive to input laser excitation for individually providing signal and idler beam pairs in such a way that each of the signal and idler beam pairs is constrained by an arithmetic sum constraint to be equal to the frequency of the input laser excitation;

at least two beat detector means corresponding in number to the number of optical parametric oscillator means individually responsive to two beams of said signal and idler beam pairs of said at least two optical parametric oscillator means for individually providing beat detection signals of known sign, in such a way that each of the beat detection signals is constrained by an arithmetic difference constraint to be equal to the arithmetic difference of the two beams of said signal and idler beam pair of said at least two optical parametric oscillator means; and means coupled to each of said at least two optical parametric oscillator means for stabilizing the optical parametric oscillator means at said frequencies of said signal and idler beam pairs thereof.

2. The invention of claim 1, wherein said input laser excitation is at a frequency that is common to at least two of said at least two optical parametric oscillator means.

3. The invention of claim 1, wherein said input laser excitation is at a different frequency for at least two of said at least two optical parametric oscillator means.

4. The invention of claim 1, wherein said two beams of said signal and idler beam pairs of at least one of said at least two beat detector means include signal and idler beams from different pairs of said signal and idler beam pairs of said at least two optical parametric oscillator means.

* * * * *